(12) United States Patent
Rudinec

(10) Patent No.: US 9,580,966 B2
(45) Date of Patent: Feb. 28, 2017

(54) ALL ELECTRIC POWERED MOBILE JUMBO DRILL MACHINE

(75) Inventor: Stephen A. Rudinec, Iron Mountain, MI (US)

(73) Assignee: Lake Shore Systems, Inc., Rhinelander, WI (US)

( * ) Notice: Subject to any disclaimer, the term of this patent is extended or adjusted under 35 U.S.C. 154(b) by 399 days.

(21) Appl. No.: 13/216,390

(22) Filed: Aug. 24, 2011

(65) Prior Publication Data

US 2013/0048382 A1 Feb. 28, 2013

(51) Int. Cl.
| | | |
|---|---|---|
| *E21B 7/02* | (2006.01) | |
| *B60L 11/18* | (2006.01) | |
| *E21F 17/06* | (2006.01) | |

(52) U.S. Cl.
CPC .......... *E21B 7/025* (2013.01); *B60L 11/1801* (2013.01); *B60L 11/1803* (2013.01); *B60L 2200/40* (2013.01); *E21F 17/06* (2013.01); *Y02T 10/7005* (2013.01)

(58) Field of Classification Search
CPC ................................ E21F 13/025; E21F 17/06
USPC .................. 175/122, 162, 170, 203
See application file for complete search history.

(56) References Cited

U.S. PATENT DOCUMENTS

| | | |
|---|---|---|
| 3,336,997 A | 8/1967 | Yates et al. |
| 4,320,814 A | 3/1982 | Middelhoven |
| 4,415,051 A | 11/1983 | Taylor |
| 5,050,688 A * | 9/1991 | Patterson ...................... 173/147 |
| 5,163,537 A | 11/1992 | Radev |
| 5,285,866 A | 2/1994 | Ackroyd |
| 5,293,947 A * | 3/1994 | Stratton ........................ 180/2.1 |
| 5,358,058 A | 10/1994 | Edlund et al. |
| 5,465,798 A | 11/1995 | Edlund et al. |
| 5,913,811 A | 6/1999 | Kinugawa et al. |
| 6,962,050 B2 | 11/2005 | Hiraki et al. |
| 7,053,568 B2 | 5/2006 | Rudinec |
| 7,303,238 B1 | 12/2007 | Remus et al. |
| 7,443,083 B2 | 10/2008 | Genis et al. |
| 7,791,292 B2 * | 9/2010 | Glasl et al. .................... 318/139 |
| 8,660,760 B2 * | 2/2014 | Piipponen et al. ............. 701/50 |
| 8,714,286 B2 * | 5/2014 | Kouvo et al. .................. 180/2.1 |
| 2003/0205421 A1 | 11/2003 | Allen et al. |
| 2004/0134694 A1 | 7/2004 | Allen et al. |
| 2006/0273756 A1* | 12/2006 | Bowling et al. .............. 320/107 |
| 2010/0148567 A1* | 6/2010 | McClure ......................... 299/64 |
| 2011/0224859 A1* | 9/2011 | Pipponen et al. .............. 701/22 |
| 2012/0298004 A1* | 11/2012 | Osara et al. ................... 102/313 |
| 2013/0214928 A1* | 8/2013 | Kuittinen et al. ............. 340/669 |
| 2013/0228377 A1* | 9/2013 | Kuittinen et al. .............. 175/57 |

FOREIGN PATENT DOCUMENTS

JP 06-327-102 11/1994

* cited by examiner

*Primary Examiner* — David Bagnell
*Assistant Examiner* — Michael Goodwin
(74) *Attorney, Agent, or Firm* — Reinhart Boerner Van Deuren P.C.

(57) ABSTRACT

An all-electric powered mobile jumbo drill machine configured to use provided AC electric power and on board battery provided electric power and operated in a mining environment.

14 Claims, 6 Drawing Sheets

ALL ELECTRIC POWERED MOBILE JUMBO DRILL MACHINE

BACKGROUND OF THE INVENTION

Field of the Invention

The present disclosure is related generally to vehicles, particularly all-electric powered vehicles, and more specifically to an all electric powered mobile jumbo drill machine configured to selectively use provided AC electric power or a self-contained electric power source for mining and construction environments.

A mining jumbo drill is a piece of mining equipment that drills holes into material being mined, for example, limestone, salt, precious metal, copper, nickel, granite. The purpose of the drilled holes is to provide orifices for explosive material that are used to blast the material being mined from the substrate. Once the mined material is blasted from the substrate, such material is collected and carried out of the mine.

The jumbo drill may operate its drills from provided AC electric mine power or diesel engines to drive hydraulic pumps. The mine's AC power is connected to a three phase induction motor mounted on the mobile jumbo drill which drives a hydraulic circuit for controlling hydraulic percussive rotary hammers or rotary hammers. For purposes of this disclosure, the term hammer shall mean one of a percussive rotary hammer and a rotary hammer configured to create a hole in material to be mined, and is referred to as a drilling operation. The holes, which can be of various length and diameter, are drilled into the face (front wall), floor (bottom), back (top or roof), or ribs (side walls) of the mine tunnel.

Upon completion of a drilling pattern or operation in one of the mine rooms, the jumbo drill must move to the next room in the mine and start the drilling procedure again in the new location. Moving from one room to another room in the mine tunnel is often referred to as tramming. Most mobile mine drills either tram using diesel power or by an electric motor with the electric power provided by a trailing electric cable coupled to a power station located within the mine tunnel.

Typically, several power stations may be provided within the mine since federal regulations limit the distance that the mobile mine drill can be from the mine power station while coupled to the power station with the electric cable. In a typical mine facility, the AC power station is moved to a new location within the mine as needed. Since the tramming distance between rooms may exceed the regulated distance from a specific mine power station, a typical tramming operation occurs with a diesel powered motor. In such situations, the diesel powered tram emits diesel particulate matter (DPM) emissions while tramming with the diesel powered motor, the electric cable that is coupled to the mine power station (which is used for the drilling operation) is unreeled from a cable reel mounted on the mobile drill. As the drill moves from one room to another room the cable is unreeled and disposed on the floor of the mine tunnel.

When the cable is laying on the mine floor, it is subject to certain risks such as being cut while moving or being cut by another piece of mine equipment. If the power cable is damaged or cut during the procedures, it is necessary to repair or replace the cable. Such downtime is expensive as well as the cost related to the repair kits and manpower necessary to transport replacement equipment and perform the necessary repairs. It is known that such repairs are commonly necessary to the point that mine companies employ cable repair men and cable splice kit runners whose job is to constantly be on call to deliver the proper size splice kits and repair kits to equipment operators and mechanics operating the drilling equipment.

It is also known that when operating the mobile jumbo drill with diesel engines to move from one room to another room of the mine tunnel adequate ventilation must be provided. It is known that a mine operation must provide adequate ventilation per a plan to a level of movement of air in units (CFM) per every horsepower of diesel power utilized in the mine shaft. Further, diesel engines require considerable maintenance in the mine environment which requires changing of filters and scrubbers from the diesel operations.

The apparatus of the present disclosure must also be of construction which is both durable and long lasting, and it should also require little or no maintenance to be provided by the user throughout its operating lifetime. In order to enhance the market appeal of the all electric mobile jumbo drill machine, it should also be of inexpensive construction to thereby afford it the broadest possible market. Finally, it is also an objective that all of the aforesaid advantages and objectives be achieved without incurring any substantial relative disadvantage.

SUMMARY OF THE INVENTION

The disadvantages and limitations of the background art discussed above are overcome by the present invention. With this invention, there is disclosed an all electric powered jumbo drill machine configured to use provided AC electric power. The mobile jumbo drill includes a support structure including a plurality of wheel sets. A self-contained battery module is removably mounted on the support structure. At least one hydraulic hammer is coupled to the support structure. An AC motor is mounted on the support structure and coupled to at least one wheel set and the battery module. A DC/AC inverter and variable speed drive is coupled to the AC motor and to the battery module.

A battery charger is in electrical communication with the battery module and the battery charger is mounted on the support structure. A hydraulic pump is coupled to the AC motor and to one of one wheel set and the hydraulic hammer, with the hydraulic pump also coupled to a hydraulic motor. A cable reel is mounted on the support structure and includes an electric cable coupled to one of the battery charger and the AC motor. A provided AC power is transmitted through the electric cable and energizes one of the AC motor coupled to the hydraulic hammer to drill in the mine and the battery charger to charge the battery. The power from the battery module powers the hydraulic motor for movement of the support structure.

In some situations, the provided AC power can be provided by a power station located in the mine structure in which the all electric powered mobile jumbo drill machine operates. Since the length of the electric cable is governed by applicable governmental regulations, the distance from a particular AC power station is limited to a length of the cable mounted on the cable wheel.

In another embodiment, a second hammer and associated drill motor is coupled to the support structure with the second hammer motor coupled to a second hydraulic pump. The second hydraulic pump is coupled to one of the battery module and the provided AC electric power.

In another embodiment, the AC electric motor is an electric induction motor.

There is also provided a system for powering a mobile mine jumbo drill with only electric energy. The mobile mine jumbo drill includes a support structure, a plurality of wheel sets, a hammer assembly, and an electric cable mounted on a cable reel.

The system includes a self-contained battery module removably mounted on the support structure. A battery charger is mounted on the support structure and coupled to the battery module and the electric cable. The battery module is charged by electric power through the electrical cable. A DC/AC inverter and variable speed drive apparatus is coupled to the battery module. An AC electric motor is mounted on the support structure and coupled to at least on wheel set and the inverter and variable speed drive apparatus.

The mobile mine jumbo drill is configured to move from a first position to a second position by electric energy from the battery module through the AC electric motor powering a hydraulic pump and hydraulic motor coupled to at least one wheel set. The mobile mine jumbo drill is also configured to energize the hammer assembly by the electric pump coupled to the AC electric motor. The electric cable is coupled to provided AC power at a power station positioned in a mine environment in which the mobile mine jumbo drill is operated. In another embodiment the AC electric motor is an induction motor.

There is further provided a method for moving a mobile mine jumbo drill and operating a mine hammer apparatus coupled to the mobile mine jumbo drill using only electricity as an energy source. The method includes connecting the mobile mine jumbo drill to a provided AC electricity source located in the mine with an electric cable mounted on the mobile mine jumbo drill. The mine jumbo drill apparatus is energized with the electricity from the provided AC electricity source through the electric cable. The provided AC electricity source is connected to a battery charger mounted on the mobile mine jumbo drill with the battery charger coupled to a self-contained battery module removably mounted in the mobile mine jumbo drill. An AC electric motor is energized with electricity from one of the battery module and the provided AC electricity source. The AC electric motor is coupled to a hydraulic pump configured to one of moving the mobile mine jumbo drill from a first position to a second position and to power the mine hammer apparatus.

In another embodiment of the method for moving a mobile mine jumbo drill and operating a mine hammer apparatus coupled to the motor mine drill using only electricity as an energy source also includes connecting at least a second mine hammer assembly to the mobile mine jumbo drill. The second mine hammer assembly is coupled to a second hydraulic pump with the second hydraulic pump coupled to one of the battery module and the provided AC electricity source. In another embodiment, the AC electric motor is an induction motor.

The apparatus of the present disclosure is of a construction which is both durable and long lasting, and which will require little or no maintenance to be provided by the user throughout its operating lifetime. The apparatus of the present disclosure is also of inexpensive construction to enhance its market appeal and to thereby afford it the broadest possible market. Finally, all of the aforesaid advantages and objectives are achieved without incurring any substantial relative disadvantage.

DESCRIPTION OF THE DRAWINGS

These and other advantages of the present disclosure are best understood with reference to the drawings, in which.

DETAILED DESCRIPTION OF THE EXEMPLARY EMBODIMENTS

An all electric mobile jumbo drill machine 100 has been developed to operate in a mine environment, for example a limestone, salt, precious metal, copper, nickel, granite, or other material determined by an operator of the machine 100 mine, utilizing only electric power for both moving the all electric mobile jumbo drill machine 100 from a first position to a second position within the mine environment and also to power the drilling operation. A mobile drill, referred to as a jumbo drill, operates in a mine utilizing provided AC electric mine power 102 to operate its hammers. The mobile jumbo drill 100 may have one or more hammers mounted on the mobile jumbo drill. However, in conventional mobile jumbo drills, movement of the machine from one position to another position is typically done with an internal combustion engine, such as a diesel engine. Such engines generate particulate matter in the mine environment atmosphere which then requires expensive ventilation equipment in the mine which increases cost of operation of the mine and maintenance of the machine 100 filter system.

As disclosed herein, the all electric mobile jumbo drill machine 100 eliminates the need for an internal combustion engine for moving the machine from a first position to a second position. Referring to the FIGS. 1-6, FIGS. 5 and 6 illustrate an exemplary embodiment of an all electric mobile jumbo drill machine 100.

The mobile jumbo drill 100 includes a support structure 104 configured to support the equipment used for both moving the mobile jumbo drill and the equipment for a drilling operation. The support structure 104 is composed of material, such as steel and configured for efficient and structural integrity of the mobile jumbo drill machine. In some embodiments, the support structure 104 can be articulated including a pivot between portions of the support structure 104.

Figure 5:
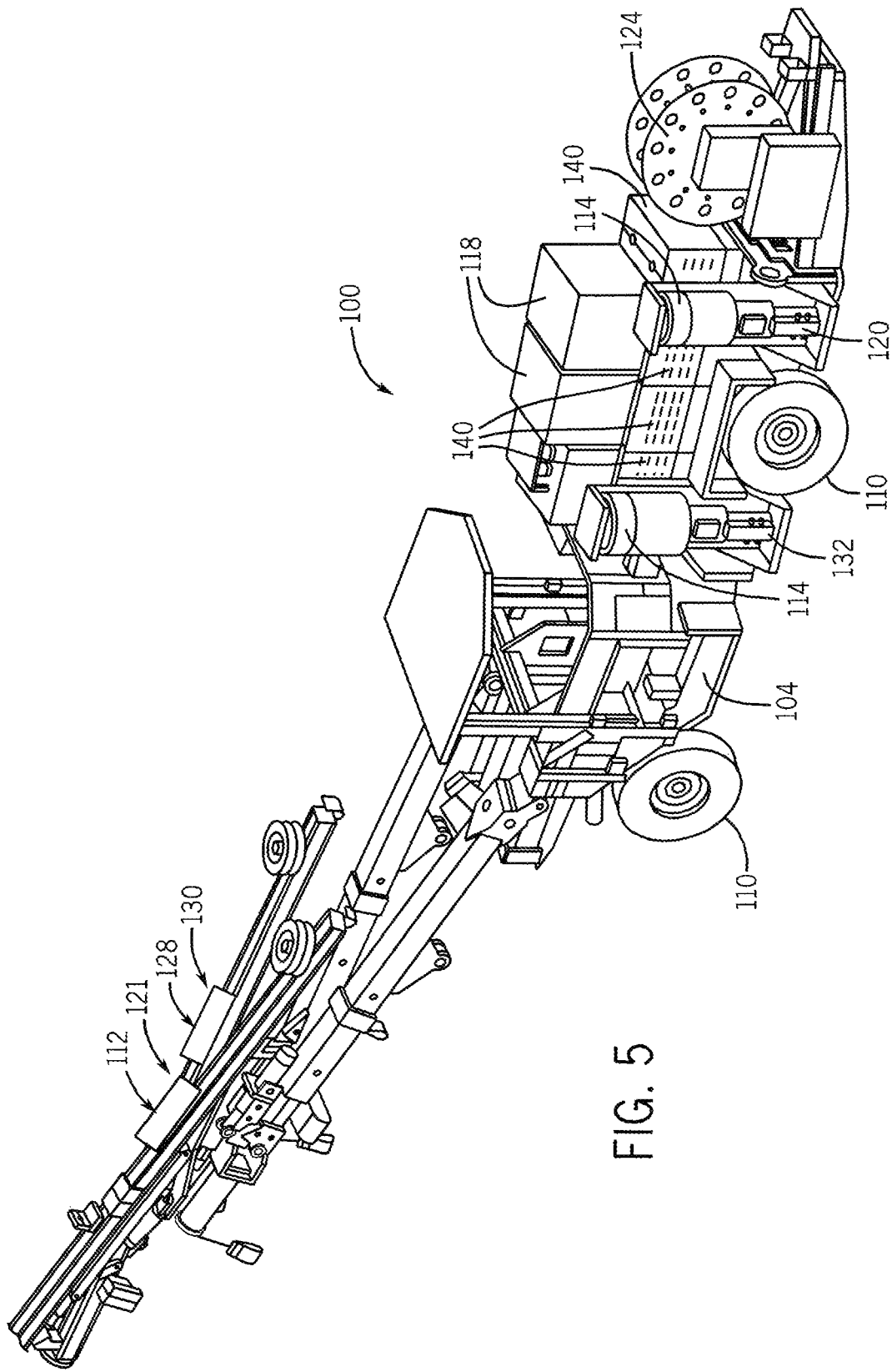
FIG. 5 is a perspective illustration of the left side of the all electric powered mobile jumbo hammer machine of FIG. 3 including a second hydraulic drill.
Figure 6:
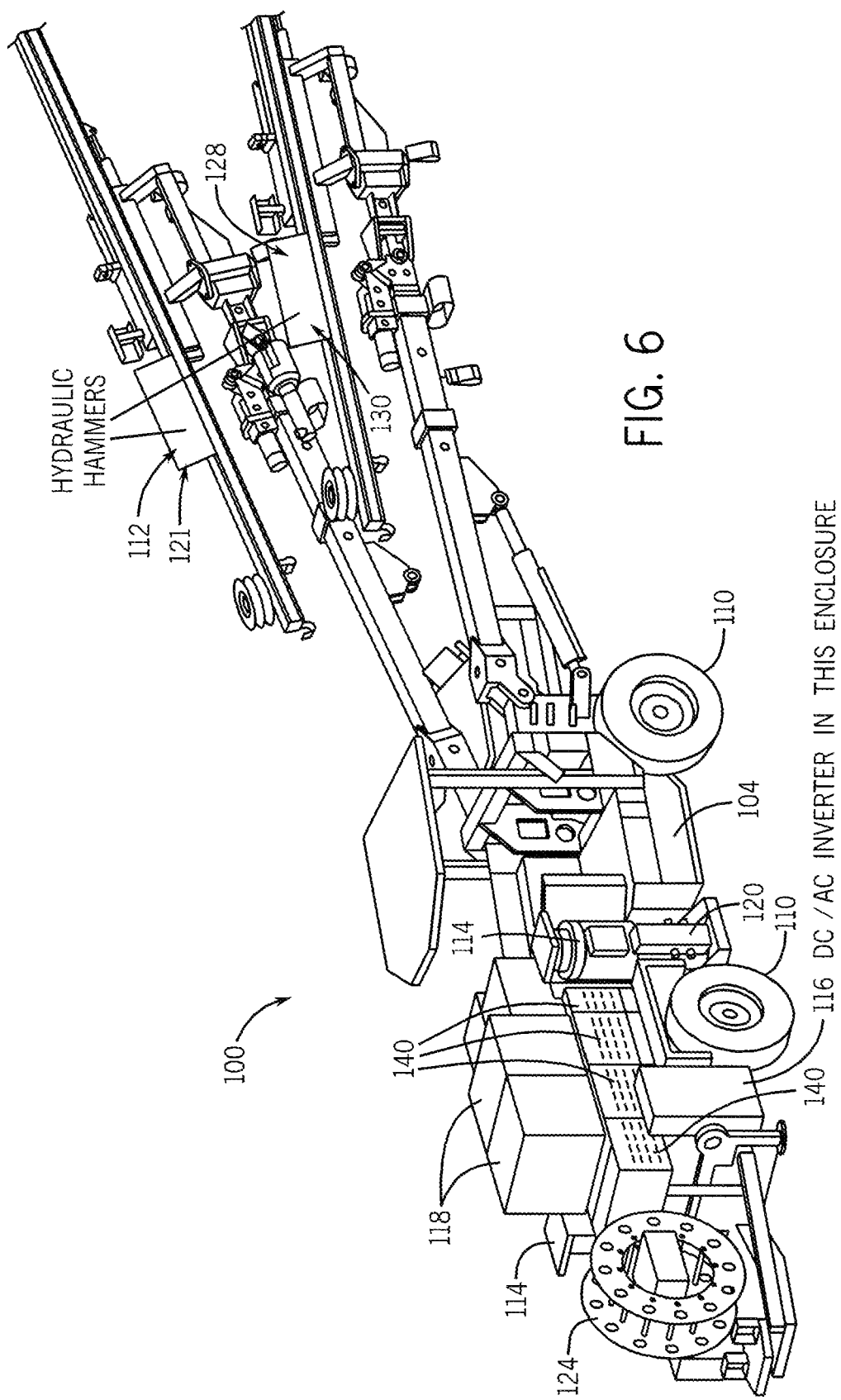
FIG. 6 is a perspective illustration of the right side of the all electric powered mobile jumbo drill machine illustrated in FIG. 5.

FIG. 5 illustrates a left side of an all electric mobile jumbo drill machine 100 and FIG. 6 illustrates a right side of the machine. In a typical configuration, a hydraulic hammer 112 is mounted on a boom extending from the front of the support structure 104. A second hammer 128, and second motor 130, as illustrated in the figures can be mounted on a separate boom also mounted on the front of the support structure 104. The booms typically are articulated by fluid actuators controlled by an operator of the all electric mobile jumbo drill machine 100 during a drilling operation.

The support structure 104 typically includes surface support structures, such as wheels 110. In the illustrated exemplary embodiment, the support structure 104 has a first wheel set 106 and a second wheel set 108. Each wheel set can be operated independently and also can be operated simultaneously as determined by an operator of the mobile jumbo drill machine.

The support structure 104 also provides a platform for mounting the various components of the all electric mobile jumbo drill machine 100. A self-contained battery module 140 is removably mounted on the support structure 104. Multiple battery modules 140 can be mounted on the support structure 104. In a typical configuration, the battery module 140 is configured with a series of absorbed glass mat (AGM) batteries. (The battery media may also be a valve regulated lead acid battery, a lithium ion battery standard flooded lead acid battery, nickel metal hydride battery, or a sodium ion battery). As many as 40 AGM batteries can be mounted in a housing and electrically coupled together to provide electric energy at 240 volt DC at 400 amp hours thereby defining a battery module. The battery modules 140 are configured to be recharged while on the support structure 104, however the battery module 140 can be removed in the event of failure or maintenance requirements. A number of battery modules, for example 2 or 3 modules can be mounted on the support structure 104 as determined by an operator and within the physical limits of the support structure 104, wherein the available electric power is increased.

Figure 1:
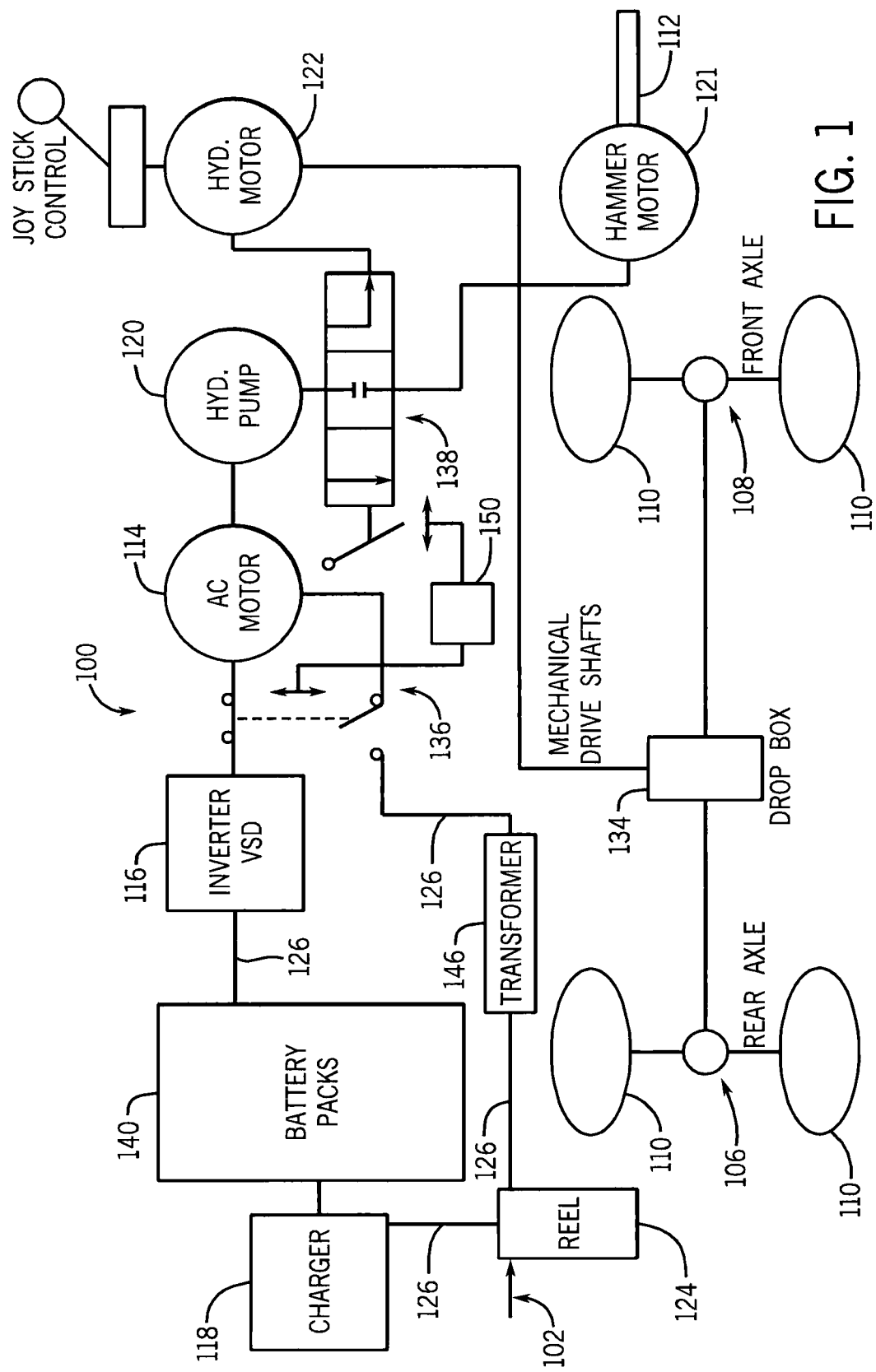
FIG. 1 is a schematic diagram of an exemplary embodiment of an all electric powered mobile jumbo drill machine coupled to provided AC power, with the machine configured to move and drill only with electric energy.

An AC motor 114 is mounted on the support structure 104 and coupled to at least one wheel set 106, 108, and the battery module 140. As illustrated in FIG. 1, the AC motor 114 is configured to receive the power from the battery module 140 through an inverter and variable speed drive unit 116. In a preferred embodiment, the AC motor 114 is an electric induction motor. The jumbo drill machine 100 can also be configured with a DC motor, for example a brushless DC motor or a switched reluctance motor. The electric induction motor is properly sized for the particular operation of the all electric mobile drive machine 100 and can be, for example with a rated horsepower in the range of 50 to 150 horsepower or such other appropriate horsepower rating needed for a specific application. The electric motor is configured to drive hydraulic pumps at either a constant speed, or a variable speed to maximize the efficiency of the electric/hydraulic circuit. The electric motor may also be configured with a speed feedback circuit utilizing either encoders coupled to the motor and hydraulic pump or with a sensorless configuration through software installed on a system controller 150. The AC motor 114 can also receive electric power from the provided AC mine electric power 102 through a transformer 146. An electric switch device 136, as controlled by the system controller 150, can switch the AC motor 114 between electric power from one of the battery module 140 and the provided AC electric power 102. The system controller 150 in conjunction with input controls, for example joy-sticks, operates the various functions on the all electric powered mobile jumbo drill 100.

Figure 3:
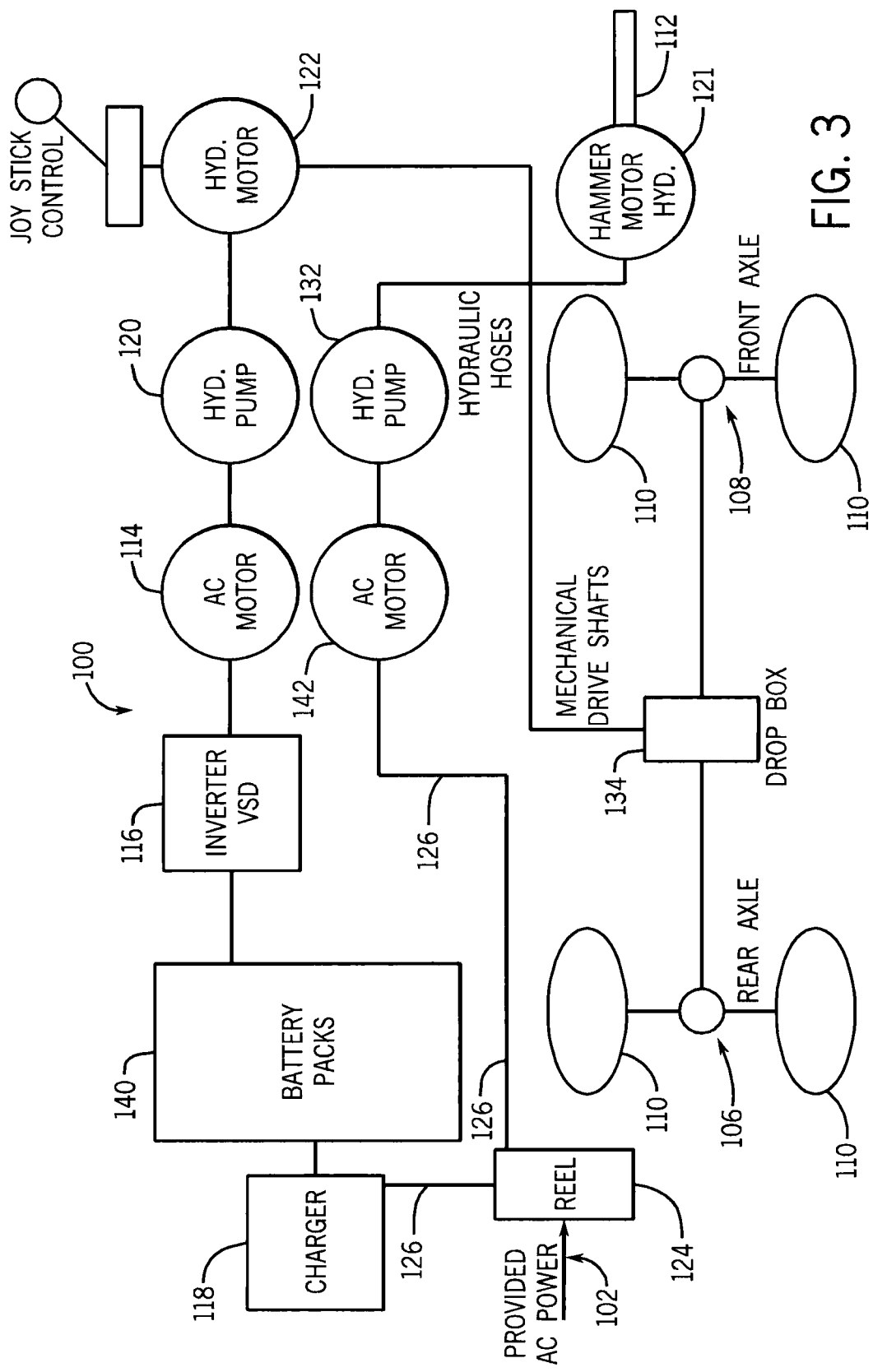
FIG. 3 is a schematic diagram of the all electric powered mobile jumbo drill machine coupled to provided AC power configured to move with one AC motor powered hydraulic pump and motor and hammer with a second AC motor powered hydraulic pump and motor.

The battery charger 118 is in electrical communication with the battery module 140. The battery charger 118 is mounted on the support structure 104. The battery charger 118 may include a battery status (health) monitoring and management system. As illustrated in FIGS. 5 and 6, a plurality of battery chargers 118 are mounted on the support structure 104 above the battery modules 140. Further, as illustrated in FIGS. 1 and 3, the battery charger 118 is also coupled by appropriate electrical cables 126 to the provided AC electric power 102. An electric cable 126 is mounted on a cable reel 124 coupled to the support structure 104. As previously discussed, the cable 126 mounted on the cable reel 124 is coupled to power stations within the mine environment and are coupled to the provided AC electric power 102. As the all electric mobile drill machine 100 moves from a first position to a second position from the mine, the electric cable 126 is unreeled as the support structure 104 is moved. The provided AC electric power 102, as described below, is used to power the drilling operation and charge the battery module 140. Because of federal mine regulations, the electric cable coupling the all electric mobile drill machine 100 to the mine provided AC electric power 102 is limited in distance and therefore the mine typically may provide a plurality of power stations or move a power station within the mine to accommodate the all electric mobile drill machine 100. Movement of the all electric mobile jumbo drill machine 100 is accomplished utilizing the electric power from the battery modules 140 to power the AC motor 114 for moving the mobile drill 100 from a first position to a second position.

The AC electric motor 114 is coupled to a hydraulic pump 120. In one embodiment, the hydraulic pump 120 is coupled through a hydraulic valve 138 to one of a wheel set 106, 108 and a hydraulic drill 112. As determined by an operator of the all electric mobile jumbo drill machine 100, by controlling the system controller 150, the hydraulic valve 138 can fluidly connect the hydraulic pump 120 to either a hydraulic motor 122 which is used to move the electric jumbo drill machine 100 or to a hydraulic drill motor 121 which is coupled to the hydraulic drill 112.

When the hydraulic pump 120 is coupled to the hydraulic motor 122 the hydraulic pump and hydraulic motor 122 function to move the support structure 104. The hydraulic motor 122 is coupled to the force transfer apparatus 134 which in turn is coupled to the first wheel set 106 and second wheel 108. The force transfer apparatus 134 transfers the force generated by the hydraulic motor 122 to a wheel set by, for example, a hydrostatic drive or a geared transmission. The force transfer apparatus 134 is configured to drive one of either wheel sets 106, 108 and both wheel sets 106, 108 at the same time as determined by the operator of the mobile jumbo drill machine 100.

When the hydraulic pump 120 is coupled to the drill motor 121, which also typically is a hydraulic motor 121, the hydraulic pump 120 provides power to the hammer motor 121 which in turn operates the hydraulic hammer 112. The hydraulic hammer 112 can be a rotary hammer or a percussive rotary hammer as determined by the operator of the mobile jumbo drill machine 100. It should be understood that appropriate hydraulic hoses suitable for use in the mine environment connect, in fluid communication, the various hydraulic pumps and hydraulic motors utilized on the all electric mobile jumbo drill machine 100.

Referring to FIG. 3, an exemplary embodiment of an all electric motor jumbo drill machine 100 illustrates a second AC motor 142 coupled to a second hydraulic pump 132 which is coupled to the hydraulic hammer motor 121. In this configuration, a separate electric/hydraulic circuit is used for the drilling operation and a separate electric/hydraulic circuit is used for the movement, or tramming, of the mobile jumbo drill machine 100 from one position to another position.

The operation of the all electric mobile jumbo drill machine 100 is configured such that the movement of the mobile jumbo drill machine 100 is accomplished by electric power provided by the battery modules 140 through the appropriate electric/hydraulic circuit as illustrated in FIGS. 1 and 3. The drilling operation is accomplished by utilizing the provided mine AC electric power 102 through the appropriate electric/hydraulic circuit.

During a drilling operation, the provided AC power 102 is also utilized to charge the battery modules 140 through the battery charger 118. In a typical cycle, the drilling operation can proceed for one hour during which the appropriate holes are drilled in the mine face. During the same time period, the batteries are being charged. A system controller 150 controls the system so that the batteries will be charged for a predetermined period to replace the spent energy from the previous movement of the mobile jumbo drill machine 100, i.e. movement from the first position to the second position. Upon completion of the drilling operation, utilizing the provided AC electric power 102 the electric cable 126 is reeled up onto the cable reel 124 and the mobile jumbo drill machine 100 is moved, utilizing the electric energy from the battery modules 140 to a new drilling position within the mine environment. In an appropriate position, the electric cable 126 from the reel 124 is coupled to a mine power station again to establish provided AC electric power with the mobile jumbo drill machine 100 moving onto the next drilling position as the electric cable is unreeled from the reel 124. Again during the movement of the mobile jumbo drill machine, power is provided through the battery modules 140. At the new drilling position, the provided AC electric power 102 is utilized to operate the drills 112 and to charge the battery modules 140 through the battery chargers 118.

In another embodiment, the all electric mobile drill machine 100 operates without provided mine AC electric power 102. See FIGS. 2 and 4. In the embodiment illustrates in FIGS. 2 and 4, the electric power for operating the drill motor 121 and the hydraulic motor 122 for tramming the vehicle from a first position to a second position is provided solely by the battery modules 140. The other elements of the all electric mobile drill machine 100 as described above in reference to FIGS. 1 and 3 are the same for the embodiments illustrated in FIGS. 2 and 4. In the embodiments illustrated in FIGS. 2 and 4, the size and capacity of the battery modules are configured to provide the appropriate and necessary electrical power for all functions of the all electric mobile jumbo drill machine 100 for a given time period and given operation. When the electric energy of the battery modules 140 are depleted to a predetermined level, the battery modules 140 can be removed and replaced with new battery modules or the all electric mobile jumbo drill machine 100 can be moved to an appropriate recharge station to replenish the electric energy in the battery module.

Figure 2:
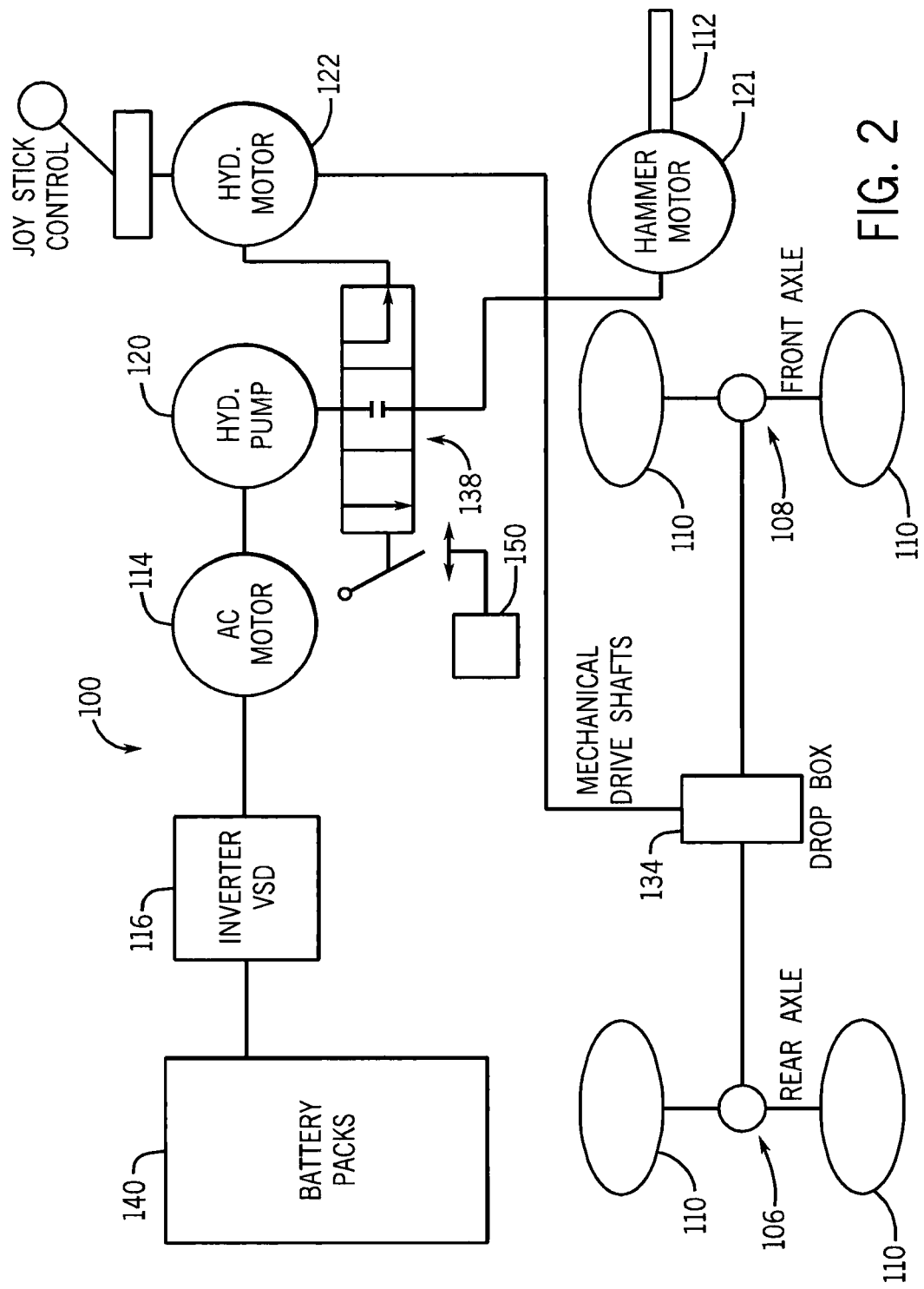
FIG. 2 is a schematic diagram of the all electric powered mobile jumbo drill machine of FIG. 1 configured to move and drill only with on-board electric energy.
Figure 4:
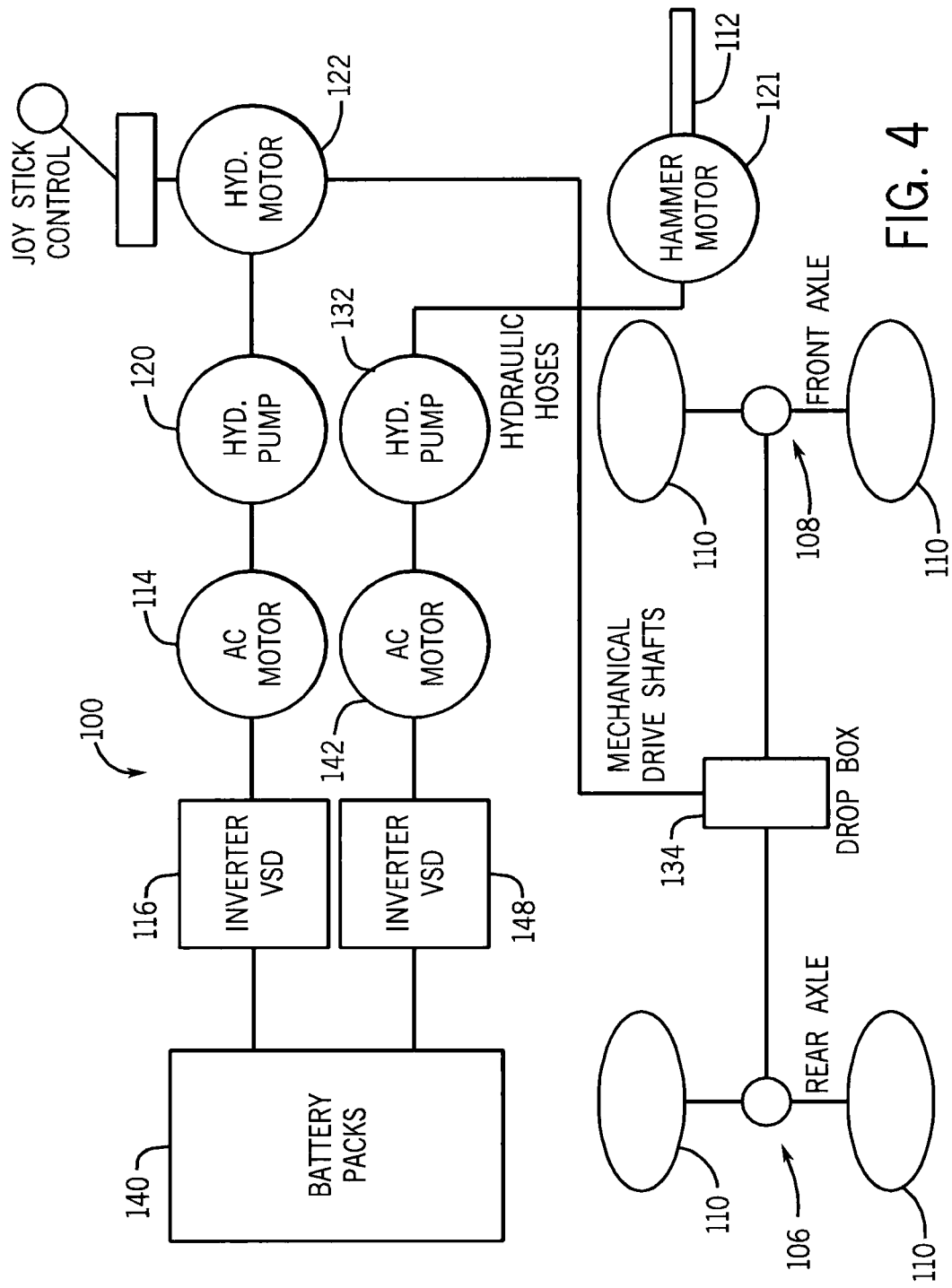
FIG. 4 is a schematic diagram of the all electric powered mobile jumbo drill machine of FIG. 3 configured to move and drill only with on-board electric energy.

In the embodiments illustrated in FIGS. 2 and 4, the drilling operation is powered solely by the battery modules 140. Such configuration is unique in the industry wherein the battery modules provide electric energy both for a drilling operation and tramming operation of the all electric mobile jumbo drill machine 100.

One advantage of the all electric powered mobile jumbo drill 100 of the present disclosure is that it is emission free and generates no exhaust as is typically found in diesel-powered mining vehicles. The preferred AC motor 114 is an induction motor which provides high torque at a reasonable rpm without the need to rev up and emit large amounts of exhaust as is typical in a diesel-powered vehicle. The DC/AC inverter and variable speed drive 116 provides the induction motor 114 with the proper voltage and frequency to achieve a desired speed. Since the AC induction motor 114 has no brushes, there is no carbon deterioration or carbon issues as is typical with a DC electric motor. As mentioned above, the preferred battery module 140 is one that includes the absorbed glass mat-type battery since such battery is classified as "non-spillable" and can be shipped as non-hazardous material. Further such absorbed glass mat batteries are maintenance free.

For purposes of this disclosure, the term "coupled" means the joining of two components (electrical or mechanical) directly or indirectly to one another. Such joining may be stationary in nature or moveable in nature. Such joining may be achieved with the two components (electrical or mechanical) and any additional intermediate members being integrally formed as a single unitary body with one another or the two components and any additional member being attached to one another. Such adjoining may be permanent in nature or alternatively be removable or releasable in nature.

Although the foregoing description of the present apparatus has been shown and described with reference to particular embodiments and applications thereof, it has been presented for purposes of illustration and description and is not intended to be exhaustive or to limit the disclosure to the particular embodiments and applications disclosed. It will be apparent to those having ordinary skill in the art that a number of changes, modifications, variations, or alterations to the apparatus as described herein may be made, none of which depart from the spirit or scope of the present disclosure. The particular embodiments and applications were chosen and described to provide the best illustration of the principles of the disclosure and its practical application to thereby enable one of ordinary skill in the art to utilize the apparatus in various embodiments and with various modifications as are suited to the particular use contemplated. All such changes, modifications, variations, and alterations should therefore be seen as being within the scope of the present disclosure as determined by the appended claims when interpreted in accordance with the breadth to which they are fairly, legally, and equitably entitled.

What is claimed is:

1. An all electric powered mobile jumbo drill machine operating in a mine configured to use provided AC electric power, the mobile jumbo drill comprising:
    a support structure including a plurality of wheel sets;
    a self-contained battery module removably mounted on the support structure;
    at least one hydraulic hammer;
    an AC motor mounted on the support structure and coupled to at least one wheel set and the battery module;
    a DC/AC inverter and variable speed drive coupled to the AC motor and the battery module;
    a battery charger in electrical communication with the battery module, with the battery charger mounted on the support structure;
    a hydraulic pump coupled to the AC motor and one of one wheel set and the hydraulic hammer;
    a hydraulic motor coupled to the hydraulic pump;
    a cable reel mounted on the support structure and including an electric cable coupled in the mine to provided AC electric power; and
    an electric switch device, coupled to a system controller, with the electric switch device configured to selectively connect the AC motor to one of the battery module and the electric cable in the mine,
    wherein the provided AC power through the electric cable energizes one of the AC motor coupled to the hydraulic hammer to drill and the battery charger to charge the battery, and wherein the electric cable is configured to be reeled up on the cable reel and the battery module is configured to power the hydraulic motor for movement from a first location to a second location and subsequent to the movement from the first location to the second location the electric cable is configured to again be coupled to the mine provided AC electric power.

2. The all electric powered mobile jumbo drill machine of claim 1, further comprising a transformer coupled to the provided AC electric power and the AC motor.

3. The all electric powered mobile jumbo drill machine of claim 1, further comprising at least a second hammer and associated second hammer motor, with the second hammer motor coupled to a second hydraulic pump, wherein the second hydraulic pump is coupled to one of the battery module and the provided AC electric power.

4. The all electric powered mobile jumbo drill machine of claim 1, further comprising at least a second self-contained battery module removably mounted on the support structure and coupled to the AC motor.

5. The all electric powered mobile jumbo drill machine of claim 1, further comprising a force transfer apparatus coupled to a hydraulic motor and the at least one wheel set.

6. The all electric powered mobile jumbo drill machine of claim 5, wherein the force transfer apparatus is coupled to a second wheel set, with the force transfer apparatus configured to drive one of either wheel sets and both wheel sets at the same time.

7. The all electric powered mobile jumbo drill machine of claim 1, wherein the AC motor is an electric induction motor.

8. A system for powering a mobile mine jumbo drill with only electrical energy, the mobile mine jumbo drill including a support structure, a plurality of wheel sets, a hammer assembly, and an electrical cable mounted on a cable reel and removably coupled to mine provided AC power, the system comprising:
- a self-contained battery module removably mounted on the support structure;
- a battery charger mounted on the support structure and coupled to the battery module and the electrical cable, wherein the battery module is charged by electric power through the electrical cable;
- a DC/AC inverter and variable speed drive coupled to the battery module;
- an AC electric motor mounted on the support structure and coupled to at least one wheel set and the DC/AC inverter and variable speed drive, with the AC electric motor configured to transfer force to a hydraulic pump coupled to one of the wheel sets and the hammer assembly; and
- a system controller coupled to the electric cable and AC electric motor, wherein the mobile mine jumbo drill is configured to move from a first position to a second position by electrical energy from the battery module or the mine provided AC power through the AC electric motor, and wherein the hammer assembly is powered by the hydraulic pump coupled to the AC electric motor;
- wherein upon movement from the first position to the second position, the system controller is configured to control the system to charge the battery module for a predetermined period to replace the energy spent from the movement from the first position to the second position.

9. The system for powering a mobile mine jumbo drill with only electrical energy of claim 8, further comprising a transformer coupled to the provided AC electric power and the AC motor.

10. The system for powering a mobile mine jumbo drill with only electrical energy of claim 8, further comprising at least a second hammer and associated second hammer motor, with the second hammer motor coupled to a second hydraulic pump, wherein the second hydraulic pump is coupled to one of the battery module and the provided AC electric power.

11. The system for powering a mobile mine jumbo drill with only electrical energy of claim 8, further comprising at least a second self-contained battery module removably mounted on the support structure and coupled to the AC motor.

12. The system for powering a mobile mine jumbo drill with only electrical energy of claim 8, further comprising a force transfer apparatus coupled to a hydraulic motor and the at least one wheel set.

13. The system for powering a mobile mine jumbo drill with only electrical energy of claim 12, wherein the force transfer apparatus is coupled to a second wheel set, with the force transfer apparatus configured to drive one of either wheel sets and both wheel sets at the same time.

14. The system for powering a mobile mine jumbo drill with only electrical energy of claim 8, wherein the AC motor is an electric induction motor.

* * * * *

UNITED STATES PATENT AND TRADEMARK OFFICE
CERTIFICATE OF CORRECTION

PATENT NO.        : 9,580,966 B2
APPLICATION NO.   : 13/216390
DATED             : February 28, 2017
INVENTOR(S)       : Stephen A. Rudinec It is certified that error appears in the above-identified patent and that said Letters Patent is hereby corrected as shown below:

Column 9, Line 37, Claim 8, delete "coupled to" and replace with --coupled, with a switch, to--

Column 10, Line 4, Claim 8, delete "to the" and replace with --to the switch, the--

Signed and Sealed this
Ninth Day of May, 2017

Michelle K. Lee
*Director of the United States Patent and Trademark Office*